(12) United States Patent
Mansour et al.

(10) Patent No.: US 10,321,460 B1
(45) Date of Patent: Jun. 11, 2019

(54) ORTHOGONAL FREQUENCY DIVISION MULTIPLEXING (OFDM) TRANSMIT PROTOCOL SELECTION BASED ON A FEEDBACK LOOP LAG CONDITION

(71) Applicant: Sprint Communications Company L.P., Overland Park, KS (US)

(72) Inventors: Nagi A. Mansour, Arlington, VA (US); Marouane Balmakhtar, Alexandria, VA (US); Aaron J. Pawlowski, Potomac Falls, VA (US); Kaushik Goswami, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 368 days.

(21) Appl. No.: 14/795,604

(22) Filed: Jul. 9, 2015

(51) Int. Cl.
| | |
|---|---|
| *H04B 1/40* | (2015.01) |
| *H04L 27/26* | (2006.01) |
| *H04W 72/04* | (2009.01) |
| *H04W 88/08* | (2009.01) |

(52) U.S. Cl.
CPC ............ *H04W 72/046* (2013.01); *H04B 1/40* (2013.01); *H04L 27/2646* (2013.01); *H04W 88/08* (2013.01)

(58) Field of Classification Search
CPC ................ H04W 72/046; H04W 88/08; H04L 27/2646; H04B 1/40
See application file for complete search history.

(56) References Cited

U.S. PATENT DOCUMENTS

| | | | |
|---|---|---|---|
| 8,514,836 B2 | 8/2013 | Frenger et al. | |
| 8,553,637 B2 | 10/2013 | Adhikari et al. | |
| 8,861,388 B2* | 10/2014 | Johansson | H04L 1/0019 370/252 |
| 2012/0128084 A1 | 5/2012 | Aguirre et al. | |
| 2013/0083681 A1* | 4/2013 | Ebrahimi Tazeh Mahalleh | H04L 5/0057 370/252 |

(Continued)

FOREIGN PATENT DOCUMENTS

| | | |
|---|---|---|
| CN | 102970717 | 3/2013 |
| EP | 1579597 | 7/2004 |

(Continued)

*Primary Examiner* — Noel R Beharry
*Assistant Examiner* — Richard Schnell

(57) ABSTRACT

An Orthogonal Frequency Division Multiplexing (OFDM) access point receives and processes beamforming feedback data from User Equipment (UE) to form a beamforming feedback loop, transmits a beamformed radio signal to the UE, and determines if the beamforming feedback loop is experiencing a beamforming lag condition, and if so, switches to a closed-loop spatial multiplexing transmit protocol. The OFDM access point receives and processes closed-loop spatial multiplexing feedback data from the UE to form a closed-loop spatial multiplexing feedback loop, transmits a closed-loop spatial multiplexed radio signal to the UE, and determines if the closed-loop spatial multiplexing feedback loop is experiencing a spatial multiplexing lag condition, and if so, switches to an open-loop spatial multiplexing transmit protocol. An OFDM access point receives and processes open-loop spatial multiplexing feedback data from the UE to form an open-loop spatial multiplexing feedback loop and transmits an open-loop spatial multiplexed radio signal to the UE.

20 Claims, 9 Drawing Sheets

(56) References Cited

U.S. PATENT DOCUMENTS

2014/0119223 A1    5/2014  Song et al.
2016/0065282 A1*   3/2016  Zhang ................... H04W 16/10
                                                     370/281
2016/0065290 A1*   3/2016  Zhu ................... H04W 52/0209
                                                     370/329

FOREIGN PATENT DOCUMENTS

| EP | 2767028    | 4/2013  |
|----|------------|---------|
| WO | 2004057775 | 7/2004  |
| WO | 2013053135 | 4/2013  |
| WO | 2013181825 | 12/2013 |
| WO | 2014072782 | 5/2014  |

* cited by examiner

ORTHOGONAL FREQUENCY DIVISION MULTIPLEXING (OFDM) TRANSMIT PROTOCOL SELECTION BASED ON A FEEDBACK LOOP LAG CONDITION

TECHNICAL BACKGROUND

Wireless communication devices include phones, computers, intelligent machines, or some other apparatus with a wireless transceiver. Wireless communication networks include base stations, distributed antenna systems, or some other type of wireless access point to exchange wireless signals with the wireless communication devices. The wireless communication devices and the wireless communication networks exchange electromagnetic signals over the air to support services like mobile Internet access, audio/video streaming, user data messaging, and the like.

Some wireless communication networks and devices use Orthogonal Frequency Division Multiplexing (OFDM) to exchange wireless data. In OFDM communication systems, multiple transmission modes may be used to provide wireless signaling to the various wireless communication devices. Accordingly, a device that is located in a first location may be serviced with a first transmission mode from a base station but then a second transmission mode when located in a second position. These transmission modes may include multiple-input and multiple-output (MIMO) or spatial multiplexing, which is often used in communications near the base station. Transmission modes may also include beamforming, which increases transmission power and is often used in communications further away from the base station.

In some instances, as wireless communication devices move within the geographic region supported by the base station, the base station may provide better communication connectivity using beamformed signals over spatial multiplexed signal, such as when located at a cell edge or in areas or high interference from other base stations. Using beamforming, the base station can use feedback data from the wireless communication device to adjust transmit parameters to provide improved robustness of data transmission or increased data rates. In other instances, the base station may provide better communication connectivity using spatial multiplexing to maintain the communication, such as when the wireless communication device is moving quickly or changing speed quickly, in which less feedback data is required. Unfortunately, current techniques of using feedback data from the wireless communication device to adjust transmit parameters are not efficient or effective.

TECHNICAL OVERVIEW

An Orthogonal Frequency Division Multiplexing (OFDM) access point receives and processes beamforming feedback data from User Equipment (UE) to form a beamforming feedback loop and responsively transmits a beamformed radio signal to the UE. An OFDM access point determines if the beamforming feedback loop is experiencing a beamforming lag condition, and if the beamforming feedback loop is experiencing the beamforming lag condition, then switches to a closed-loop spatial multiplexing transmit protocol. An OFDM access point receives and processes closed-loop spatial multiplexing feedback data from the UE to form a closed-loop spatial multiplexing feedback loop and responsively transmits a closed-loop spatial multiplexing radio signal to the UE. An OFDM access point determines if the closed-loop spatial multiplexing feedback loop is experiencing a spatial multiplexing lag condition, and if the closed-loop spatial multiplexing feedback loop is experiencing the spatial multiplexing lag condition, then switches to an open-loop spatial multiplexing transmit protocol. An OFDM access point receives and processes open-loop spatial multiplexing feedback data from the UE to form an open-loop spatial multiplexing feedback loop and responsively transmits an open-loop spatial multiplexing radio signal to the UE.

DETAILED DESCRIPTION

Figure 1:
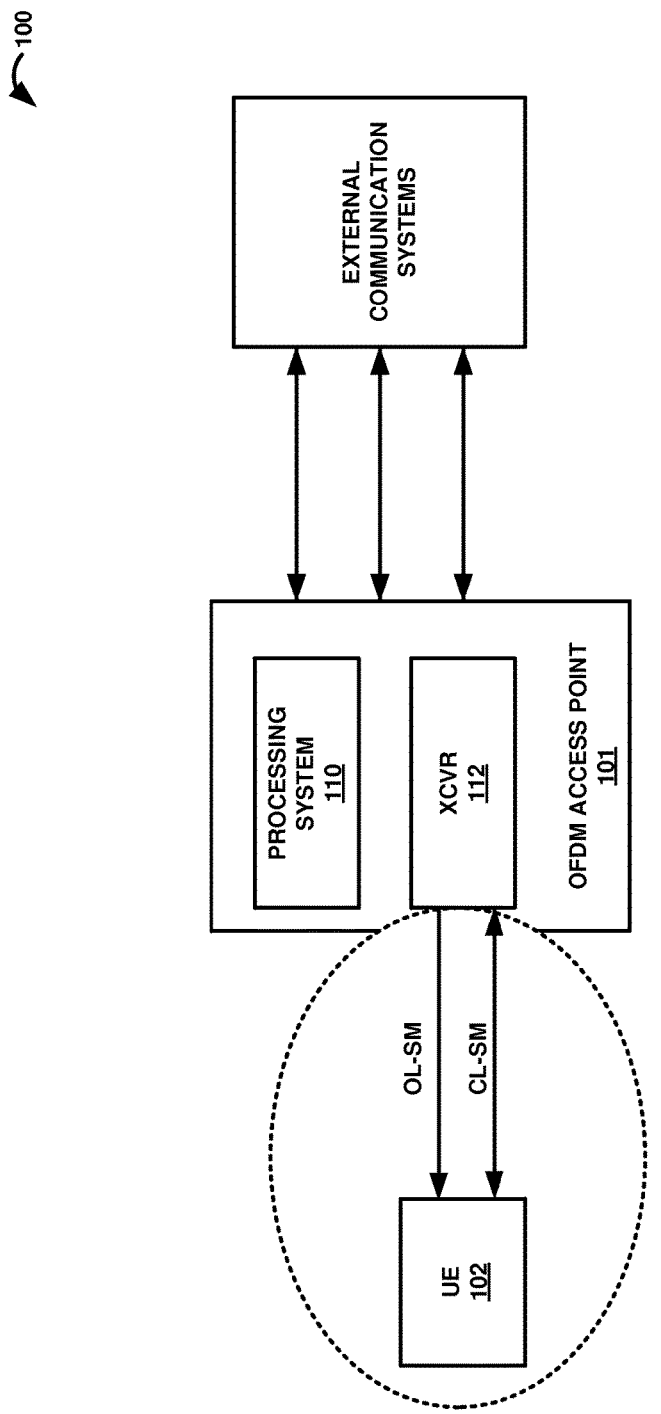
FIGS. 1-3 illustrate an Orthogonal Frequency Division Multiplexing (OFDM) communication system 100 to determine if a feedback loop for User Equipment (UE) is experiencing a lag condition, and if so, switching to another transmit protocol.

FIG. 1 illustrates Orthogonal Frequency Division Multiplex (OFDM) communication system 100 to determine if a feedback loop for User Equipment (UE) is experiencing a lag condition, and if so, switching to another transmit protocol. OFDM communication system 100 comprises OFDM access point 101, UE 102, and external communication systems. OFDM access point 101 includes data processing system 110 and wireless communication transceiver 112. ODFM access point 101 and UE 102 communicate over various transmit protocols, such as closed-loop spatial multiplexing, open-loop spatial multiplexing, and beamforming (as shown with the dotted lines).

OFDM access point 101 comprise base stations, femtocells, picocells, repeaters, or some other type of wireless access points. OFDM access point 101 include antennas, amplifiers, modulators, signal processing circuitry, memory devices, software, bus interfaces, and network interface. OFDM access point 101 could be a Long Term Evolution (LTE) eNodeB, Wireless Microwave Access (WiMAX) access point, or some other computerized wireless OFDM communication platform.

Data processing system 110 may include general purpose central processing units, microprocessors, application specific processors, logic devices, and any other type of processing device. Wireless communication transceiver 112 comprises communication components, such as antennas, ports, amplifiers, filters, modulators, signal processors, and the like.

UE 102 could be a phone, tablet computer, media player, intelligent machine, or some other apparatus having an OFDM transceiver. UE 102 includes antennas, modulators, processing circuitry, memory devices, software, and bus interfaces. The processing circuitry comprises transistors, registers, and signal paths. The memory devices comprise flash drives, disc drives, read-only circuitry, or some other data storage media.

OFDM access point 101 and UE 102 exchange data over transmit protocols. OFDM access node 101 provides various transmission modes based on the device and requirement for the communication. Here, OFDM access point 101 uses at least beamforming, closed-loop spatial multiplexing, and open-loop spatial multiplexing.

In a first operation, OFDM access point 101 receives and processes beamforming feedback data from UE 102 to form a beamforming feedback loop. Beamforming uses multiple transmitting antennas to provide increased power for particular communications. As a result of the multiple signaling formats, it may be necessary for OFDM access point 101 to transition UE 102 from communicating using a first transmit protocol to communicating using an alternative transmit protocol. OFDM access point 101 may initiate a communication with UE 102 using beamforming as a result of the beamforming signals having a higher throughput, UE 102 being located in a particular geographic location relative to OFDM access point 101, or some other reason.

Feedback data comprises channel quality indicator (CQI) measurements, pre-coded matrix index (PMI), rank index, RF power, signal-to-interference and noise, and the like. Formation of a beamforming feedback loop may be triggered by data service invocation, OFDM network attachment, Radio Frequency (RF) power loss from UE 102, time period, noise level, or some other networking factor. OFDM access point 101 forms a beamforming feedback loop by using UE specific reference signals. In response to OFDM access point 101 receiving and processing beamforming feedback data from UE 102 to form a beamforming feedback loop, OFDM access point 101 transmits a beamformed radio signal to UE 102.

OFDM access point 101 then determines if the beamforming feedback loop is experiencing a beamforming lag condition. The beamforming lag condition may be that the CQI measurements, PMI, or rank index from the feedback loop do not fit empirically determined or field tested patterns, continuously exceeding a minimum threshold for the beamforming feedback loop, or sporadically fluctuating despite adjustments made to the beamformed radio signal. In some cases, the lag condition can be determined based on the change in velocity of the beamforming feedback loop, the application requiring the communication on the device, the quality of service assessed to the user of the device, or any other transition criteria.

For example, UE 102 may initiate a communication session with OFDM access point 101 using beamforming signaling based on the proximity of UE 102 to the cell edge. OFDM access point 101 receives and processes CQI feedback data and responsively transmits a beamformed radio signal to UE 102. OFDM access point 101 uses the CQI feedback data to adjust parameters and increase performance of the beamformed radio signal. If OFDM access point 101 determines that the QCI measurements are not improving or randomly changing in response to the prior adjustments, such as when UE 102 is moving quickly within the cell, OFDM access point 101 determines that the feedback loop is too inconsistent to provide meaningful adjustments to the transmit parameters for UE 102.

If the beamforming feedback loop is experiencing a beamforming lag condition, then OFDM access point 101 switches to a closed-loop spatial multiplexing transmit protocol. Switching from a beamforming transmit protocol to a closed-loop transmit protocol allows better spectrum efficiency at higher speeds since closed-loop transmit protocol requires less feedback for an extended period of time. For example, when UE 102 is moving quickly within the cell, the feedback data may change too quickly for OFDM access point 101 to accommodate and any adjustments to the beamformed radio signal would not improve quality and in some cases, even decrease quality. This wastes overhead and does not improve service quality for UE 102. Therefore, OFDM access point 101 switches to a closed-loop spatial multiplexing transmit protocol.

In a second operation, OFDM access point 101 receives and processes closed-loop spatial multiplexing feedback data from UE 102 to form a closed-loop spatial multiplexing feedback loop. OFDM access point 101 responsively transmits a closed-loop spatial multiplexed radio signal to UE 102. OFDM access point 101 then determines if the closed-loop spatial multiplexing feedback loop is experiencing a spatial multiplexing lag condition. For example, the PMI provided by the feedback data may indicate using a specified PMI for UE 102. However, after receiving subsequent PMI feedback data OFDM access point 101 may determine that a vast range of PMIs are being required instead of repeated PMIs or PMIs meeting a field tested pattern. If the closed-loop spatial multiplexing feedback loop is experiencing the spatial multiplexing lag condition, then OFDM access point 101 switches to an open-loop spatial multiplexing transmit protocol.

In a third operation, OFDM access point 101 receives and processes open-loop spatial multiplexing feedback data from UE 102 to form an open-loop spatial multiplexing feedback loop. OFDM access point 101 responsively transmits an open-loop spatial multiplexed radio signal to UE 102. For example, if the closed-loop spatial multiplexing feedback data indicates a wide range of PMIs for UE 102, OFDM access point 101 may switch to an open-loop spatial multiplexing transmit protocol since the open-loop spatial multiplexing transmit protocol uses fixed precoding and therefore, does not require PMI feedback data.

In some examples, the beamforming feedback data and the beamforming feedback loop comprise LTE Transmission Mode 8 (TM8). TM8 uses dual-layer beamforming which permits OFDM access point 101 to weigh two layers individually at the antennas so that beamforming can be combined with spatial multiplexing for one or more UEs. Reference signals specific to UE 102 are used. Since the same resources elements are used, the reference signals must be coded differently so that UE 102 can distinguish among them.

In some examples, the beamforming feedback data and the beamforming feedback loop comprise LTE Transmission Mode 9 (TM9). TM9 uses up to eight layers and therefore, up to eight physical transmit antennas are needed. The number of layers used may be dynamic. Again, the reference signals must be pre-coded differently so that UE 102 can distinguish which reference signals are specific to it. Therefore, the precoding matrix is included in the feedback data and OFDM access point 101 does not need to know the precoding in advance. TM9 is designed to help reduce interference between base stations to maximize signal stability and boost performance. TM9 has advantages of high spectrum efficiency using higher order MIM and cell-edge data rates.

In some examples, the closed-loop spatial multiplexing feedback data and the closed-loop spatial multiplexing feedback loop comprise LTE Transmission Mode 4 (TM4). TM4 supports spatial multiplexing with up to four layers that are multiplexed to up to four antennas in order to achieve higher data rates. The feedback data for the channel can be estimated by OFDM access point 101 transmitting reference signals distributed over various resource elements and over various timeslots. No precoding matrix is included in the data but information about which precoding is preferred from a defined codebook is indicated.

In some examples, the open-loop spatial multiplexing feedback data and the open-loop spatial multiplexing feedback loop comprise LTE Transmission Mode 3 (TM3). TM3 supports spatial multiplexing of two to four layers that are multiplexed to two to four antennas in order to achieve higher data rtes. TM3 requires less UE feedback since no precoding matrix is included and the precoding is fixed. TM3 can be used when channel information is missing or when the channel is rapidly changing. For example, if UE 102 begins moving rapidly, such as when driving in a car, OFDM access node 101 would switch from TM4 to TM3 which requires less feedback data from UE 102.

In some examples, the beamforming feedback data and the beamforming feedback loop comprise dual-layer beamforming feedback data and a dual-layer beamforming feedback loop. The dual-layer beamforming feedback data and the dual-layer beamforming feedback loop may comprise LTE TM8. In this example, OFDM access point 101 receives and processes multi-layer beamforming data from UE 102 to form a multi-layer beamforming feedback loop and responsively transmits a multi-layer beamformed radio signal to UE 102. The multi-layer beamforming feedback data and the multi-layer beamforming feedback loop may comprise LTE TM9.

Still referring to above example, OFDM access point 101 would then determine if the multi-layer beamforming feedback loop is experiencing a multi-layer beamforming lag condition, and if so, then switching to a dual-layer beamforming transmit protocol. OFDM access point 101 then transmits a dual-layer beamformed radio signal to UE 102.

In other examples, the multi-layer beamforming feedback data comprises first multi-layer beamforming feedback data and a first multi-layer feedback loop for a first set of data layers and second multi-layer beamforming feedback data and a second multi-layer beamforming feedback loop for a second set of data layers.

Still referring to above example, OFDM access point 101 would determine if one of the first and the second multi-layer beamforming feedback loops is experiencing the multi-layer beamforming lag condition, and if so, then switching to a dual-layer beamforming transmit protocol. In this example, OFDM access point 101 would then transmit a dual-layer beamformed radio signal to UE 102. In other examples, OFDM access point 101 comprises an LTE network.

Figure 2:
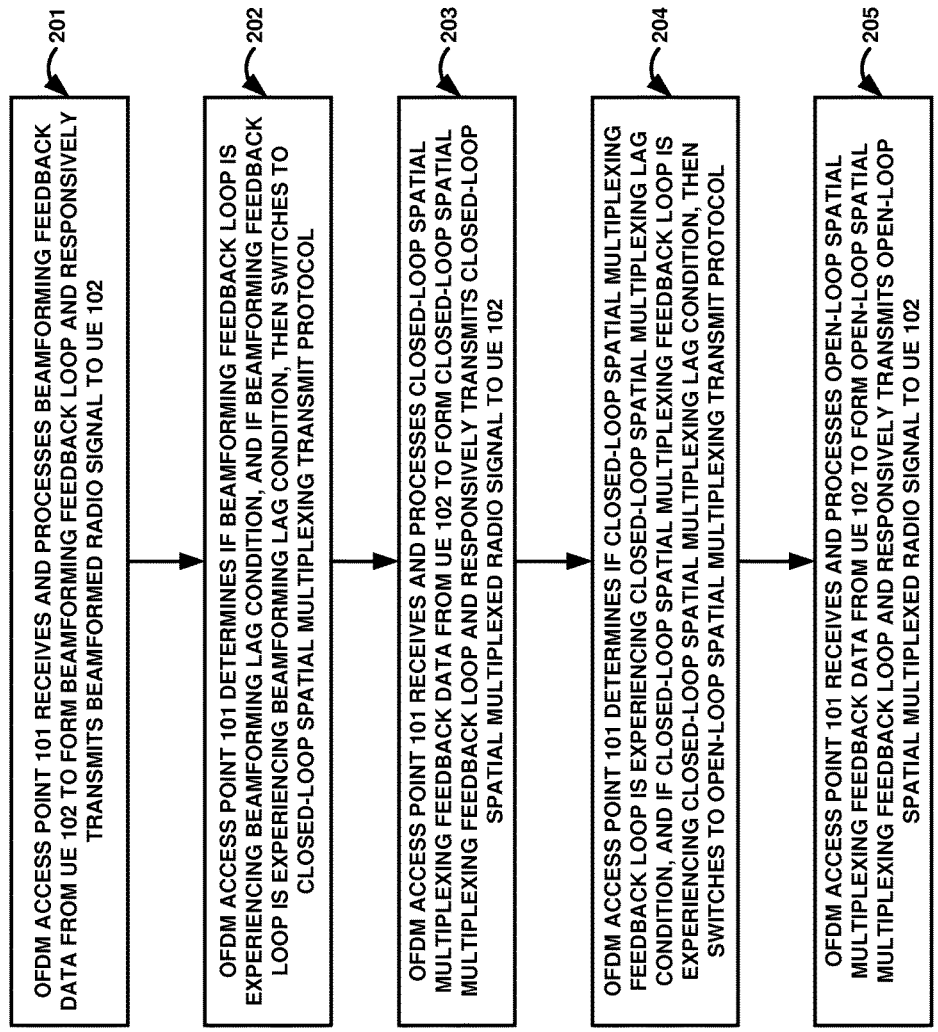

FIG. 2 is a flow diagram illustrating an operation of communication system 100 to determine if an OFDM feedback loop is experiencing a lag condition, and if so, switching to another transmit protocol. OFDM access point 101 receives (201) beamforming feedback data from UE 102. OFDM access point 101 processes (201) the beamforming feedback data to form a beamforming feedback loop. In response, OFDM access point 101 transmits (201) a beamforming radio signal to UE 102. OFDM access point 101 determines (202) if the beamforming feedback loop is experiencing a beamforming lag condition. If the beamforming feedback loop is experiencing the beamforming lag condition, then OFDM access point 101 switches (202) to a closed-loop spatial multiplexing transmit protocol.

OFDM access point 101 receives (203) closed-loop spatial multiplexing feedback data from UE 102. OFDM access point 101 processes (203) the closed-loop spatial multiplexing feedback data to form a closed-loop spatial multiplexing feedback loop. In response, OFDM access point 101 transmits (203) a closed-loop spatial multiplexing radio signal to UE 102. OFDM access point 101 determines (204) if the closed-loop spatial multiplexing feedback loop is experiencing a closed-loop spatial multiplexing lag condition. If the closed-loop spatial multiplexing feedback loop is experiencing the closed-loop spatial multiplexing lag condition, then OFDM access point 101 switches (204) to a closed-loop spatial multiplexing transmit protocol.

Still referring to FIG. 2, OFDM access point 101 receives (205) open-loop spatial multiplexing feedback data from UE 102. OFDM access point 101 processes (205) the open-loop spatial multiplexing feedback data to form an open-loop spatial multiplexing feedback loop. In response, OFDM access point 101 transmits (205) an open-loop spatial multiplexing radio signal to UE 102.

Figure 3:
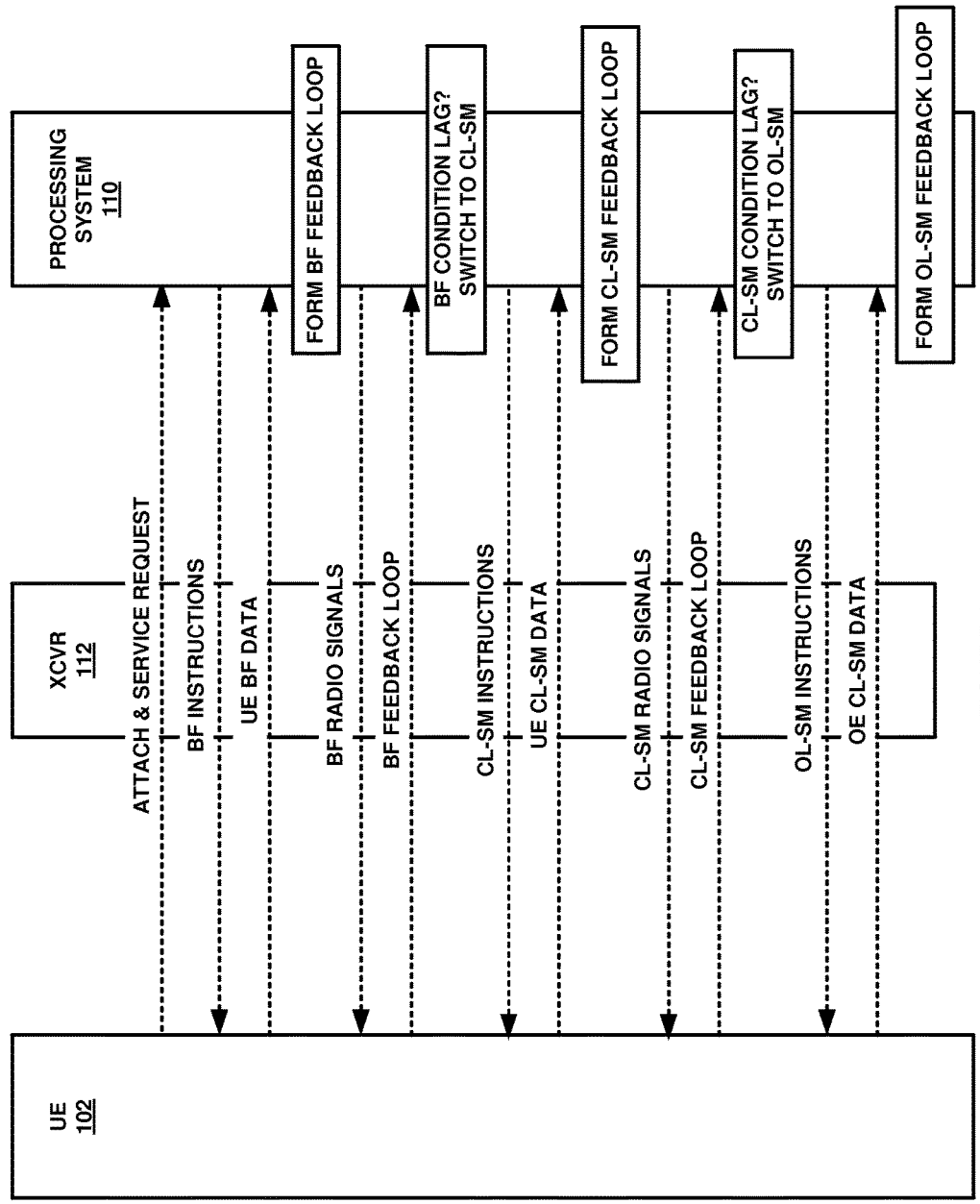

FIG. 3 is a sequence diagram illustrating the operation of communication system 100 to determine if an OFDM feedback loop is experiencing a lag condition, and if so, switching to another transmit protocol. Data processing system 110 receives an attachment and service request from UE 102 over wireless communication transceiver 112. In response, data processing system 110 transfers beamforming instructions to UE 102 over wireless communication transceiver 112. Wireless communication transceiver 112 receives UE beamforming data from UE 102 which sends the UE beamforming data to data processing system 110. Data processing system 110 then processes the UE beamforming data received by wireless communication transceiver 112 from UE 102 to form a beamforming feedback loop.

Wireless communication transceiver 112 then transmits a beamformed radio signal to UE 102 and responsively receives beamforming feedback loop. Next, data processing system 110 determines if the beamforming feedback loop is experiencing a beamforming lag condition, and if the beamforming feedback loop is experiencing the beamforming lag condition, then data processing system 110 switches to a closed-loop spatial multiplexing transmit protocol.

Still referring to FIG. 3, data processing system 110 transfers closed-loop spatial multiplexing instructions to UE 102 over wireless communication transceiver 112. Wireless communication transceiver 112 receives UE closed-loop spatial multiplexing data from UE 102 and sends the UE closed-loop spatial multiplexing data to data processing system 110. Data processing system 110 then processes UE closed-loop spatial multiplexing data received by the wireless communication transceiver 112 from UE 102 to form a closed-loop spatial multiplexing feedback loop.

Wireless communication transceiver 112 then transmits a closed-loop spatial multiplexing radio signal to UE 102 and responsively receives a closed-loop spatial multiplexing feedback loop from UE 102. Next, data processing system 110 determines if the closed-loop spatial multiplexing feedback loop is experiencing a closed-loop spatial multiplexing lag condition, and if the closed-loop spatial multiplexing feedback loop is experiencing the closed-loop spatial multiplexing lag condition, then data processing system 110 switches to an open-loop spatial multiplexing transmit protocol.

Still referring to FIG. 3, data processing system 110 transfers open-loop spatial multiplexing instructions to UE 102 over wireless communication transceiver 112. Wireless communication transceiver 112 receives UE open-loop spatial multiplexing data from UE 102 which sends the UE open-loop spatial multiplexing data to data processing system 110. Data processing system 110 processes the UE open-loop spatial multiplexing data received by wireless communication transceiver 112 from UE 102 to form an open-loop spatial multiplexing feedback loop.

Figure 4:
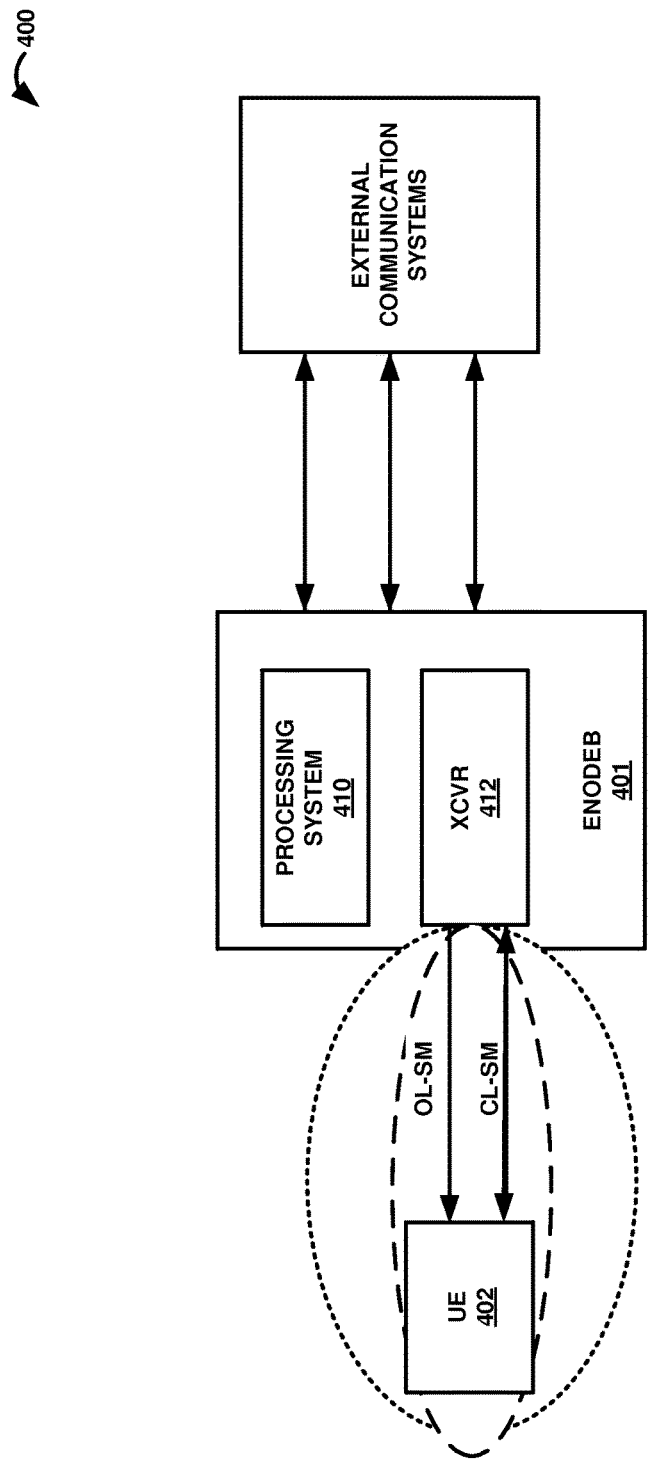
FIGS. 4-5 illustrate a Long Term Evolution (LTE) communication system 400 to determine if a feedback loop for a UE is experiencing a lag condition, and if so, switching to another transmit protocol.
Figure 5:
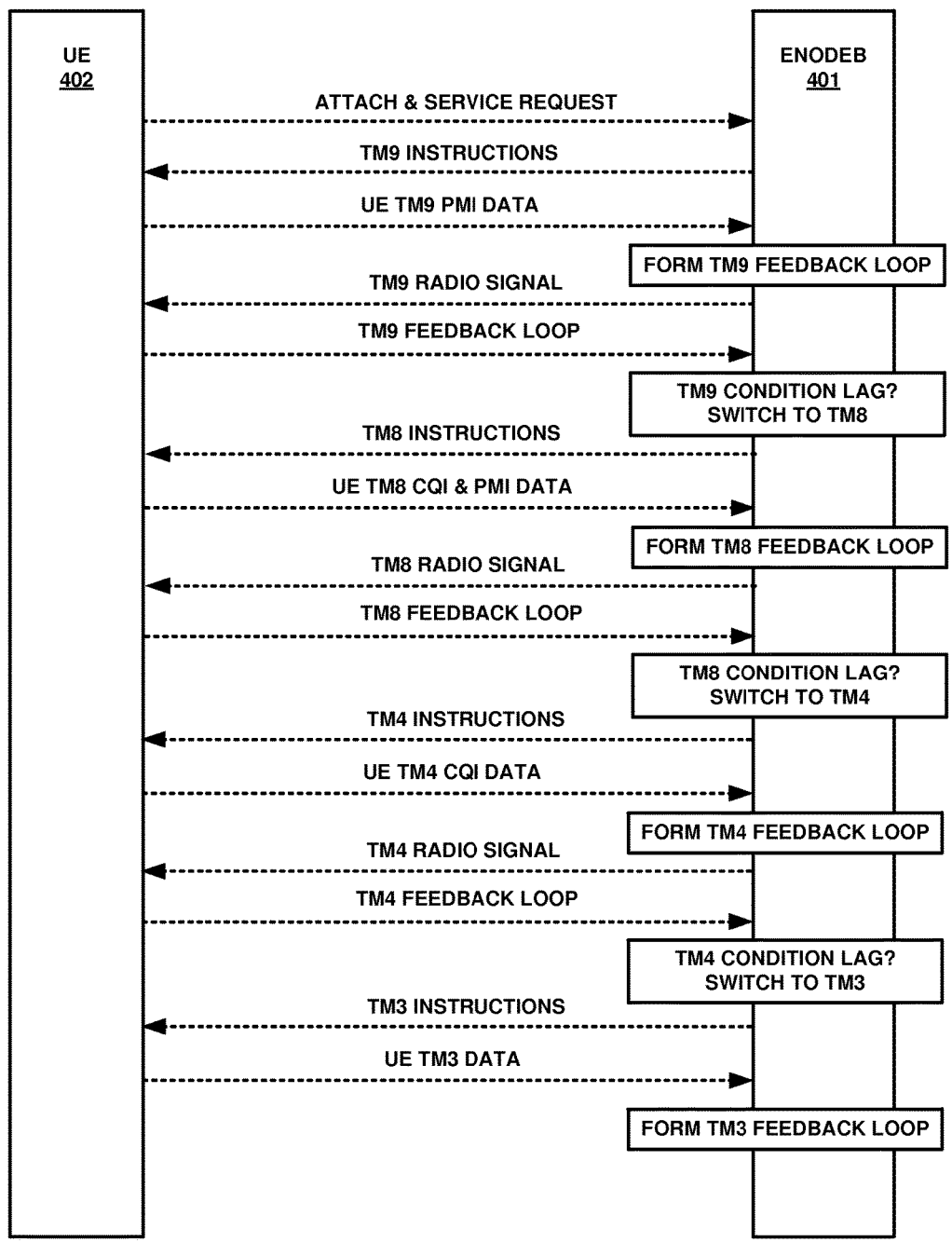

FIGS. 4-5 illustrate LTE communication system 400 to determine if a feedback loop for a UE is experiencing a lag condition, and if so, switching to another transmit protocol. Referring to FIG. 4, LTE communication system 400 comprises eNodeB 401, UE 402, and external communication network. LTE communication system 400 is an example of communication system 100, although these systems may use alternative configurations and operations. eNodeB 401 includes eNodeB transceiver 412 and eNodeB processing system 410. eNodeB 401 and UE 402 communicate using various transmit protocols, such as multi-layer beamforming (TM9), dual-layer beamforming (TM8), closed-loop spatial multiplexing (TM4), and open-loop spatial multiplexing (TM3).

Referring to FIG. 5, eNodeB 401 receives an attachment and service request from UE 402. In response, eNodeB 401 transfers TM9 instructions to UE 402 and receives UE TM9 PMI data from UE 402. eNodeB 401 then processes the UE TM9 PMI data received from UE 402 to form a TM9 feedback loop. eNodeB 401 then transmits a TM9 radio signal to UE 402 and responsively receives a TM9 feedback loop. In a next operation, eNodeB 401 determines if the TM9 feedback loop is experiencing a TM9 PMI lag condition, and if the TM9 feedback loop is experiencing the TM9 PMI lag condition, then eNodeB 401 switches to TM8.

Still referring to FIG. 5, eNodeB 401 transfers TM8 instructions to UE 402. eNodeB 401 receives UE TM8 CQI and PMI data from UE 402. eNodeB 401 then processes the dual-layer beamforming CQI and PMI data received by eNodeB 401 from UE 402 to form a TM8 feedback loop. eNodeB 401 then transmits a TM8 radio signal to UE 402 and responsively receives a TM8 feedback loop. In a next operation, eNodeB 401 determines if the TM8 feedback loop is experiencing a TM8 CQI and PMI lag condition, and if the TM8 feedback loop is experiencing the TM8 CQI and PMI lag condition, then eNodeB 401 switches to TM4.

Still referring to FIG. 5, eNodeB 401 transfers TM4 instructions to UE 402 and in response, receives UE TM4 CQI data from UE 102. eNodeB 401 then processes the UE TM4 CQI data to form a TM4 feedback loop. eNodeB 401 then transmits a TM4 radio signal to UE 402 and responsively receives a TM4 feedback loop. Next, eNodeB 401 determines if the TM4 feedback loop is experiencing a TM4 CQI lag condition, and if the TM4 feedback loop is experiencing the TM4 CQI lag condition, then eNodeB 401 switches to TM3.

In a final operation, eNodeB 401 transfers TM3 instructions to UE 402 and in response, receives UE TM3 data. eNodeB 401 processes the UE TM3 data received from UE 402 to form a TM3 feedback loop.

Figure 6:
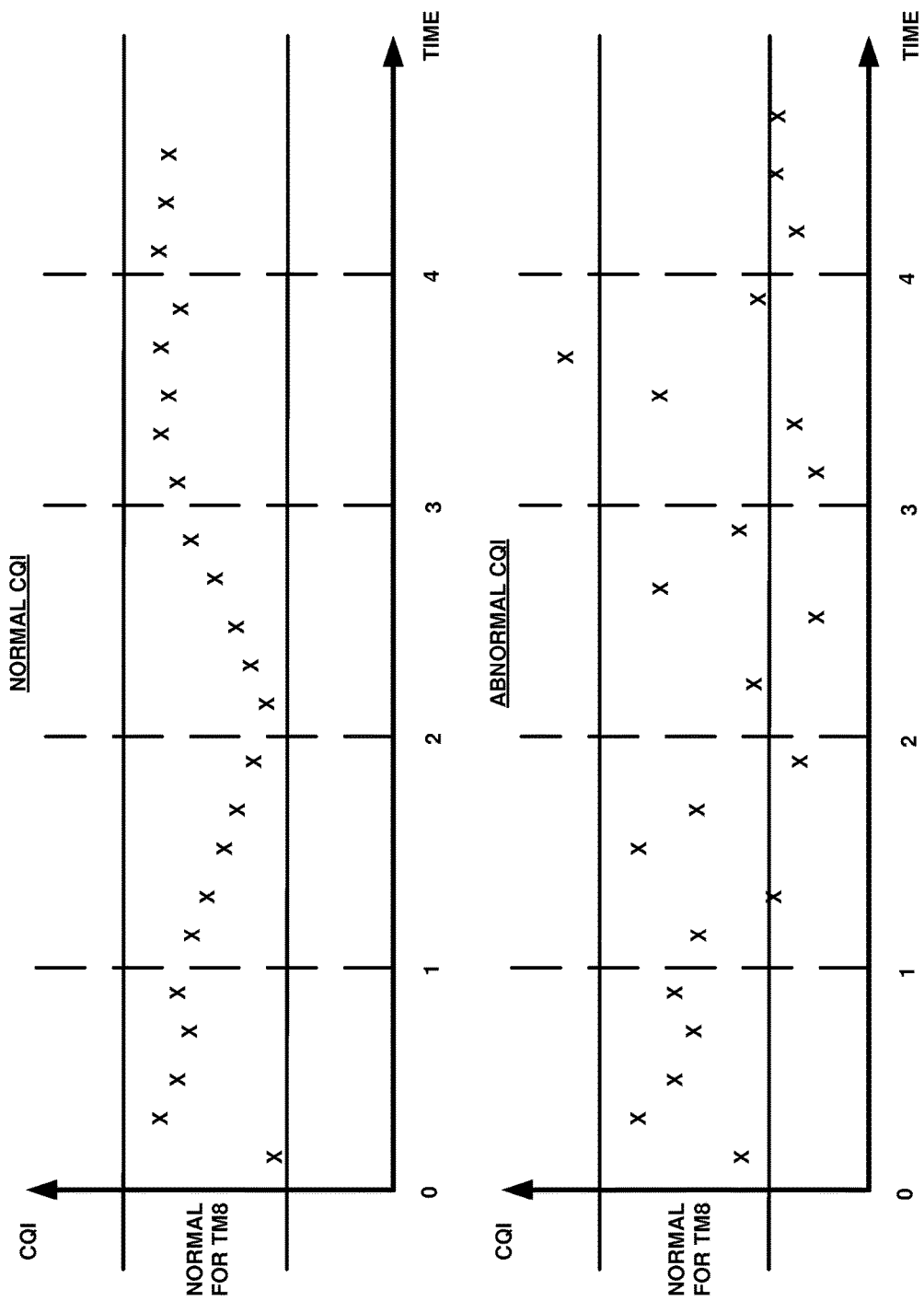
FIGS. 6-7 illustrate graphs to determine if a feedback loop for a UE is experiencing a lag condition, and if so, switching to another transmit protocol.

FIG. 6 illustrates graphs of CQI measurements to determine if a feedback loop for a UE is experiencing a lag condition, and if so, switching to another transmit protocol. Here, the lag condition is for TM8 and the CQI measurement is determined from the TM8 feedback loop data. A minimum and maximum threshold CQI measurement is determined based on empirical data or field testing for TM8. As indicated in FIG. 6, the top graph shows normal UE CQI measurements for TM8 and the bottom graph shows abnormal UE CQI measurements for TM8.

Referring to the normal CQI graph, the CQI measurements begin inside of the CQI measurement threshold values and as the OFDM access point adjusts the parameters, the CQI measurements begin to stabilize between time 0 and time 1. Between time 1 and time 2, the CQI measurements again move closer to the minimum CQI measurement threshold. However, the CQI measurements are steadily decreasing indicating to the OFDM access point that the UE is likely moving toward another access point for a handover. Between time 2 and time 3, the CQI measurements begin to steadily increase indicating to the OFDM access point that the UE is moving back toward the OFDM access point. Finally, between time 3 and time 4, the CQI measurements again stabilize within the CQI measurements thresholds indicating that the adjustments to the transmit protocol radio signal are improving the service quality for the UE.

Referring to the abnormal CQI graph, between time 0 and 1 the CQI measurements again begin inside of the CQI measurement thresholds and stabilize in response to adjustments to the transmit protocol radio signals by the OFDM access point. After time 1, the CQI measurements begin to fluctuate and move outside of the CQI measurement thresholds. In contrast to the normal CQI graph, the CQI measurements are random and not consistently increasing or decreasing with time. Furthermore, between time 2 and time 4, the CQI measurements are becoming more sporadic indicating that the adjustments to the transmit protocol radio signal are creating more inconsistencies and therefore, a lag condition exists. This may be due to the UE moving around within the cell at a high velocity and not simply moving in one direction toward another cell. Since the current transmit protocol is not providing feedback data consistently enough for the OFDM access point to use the feedback data from the feedback loop to adjust TM8 transmit parameters for the UE, the OFDM access point switches to another transmit protocol, such as TM4, that requires less feedback data and decreases overhead for the communication session.

Figure 7:
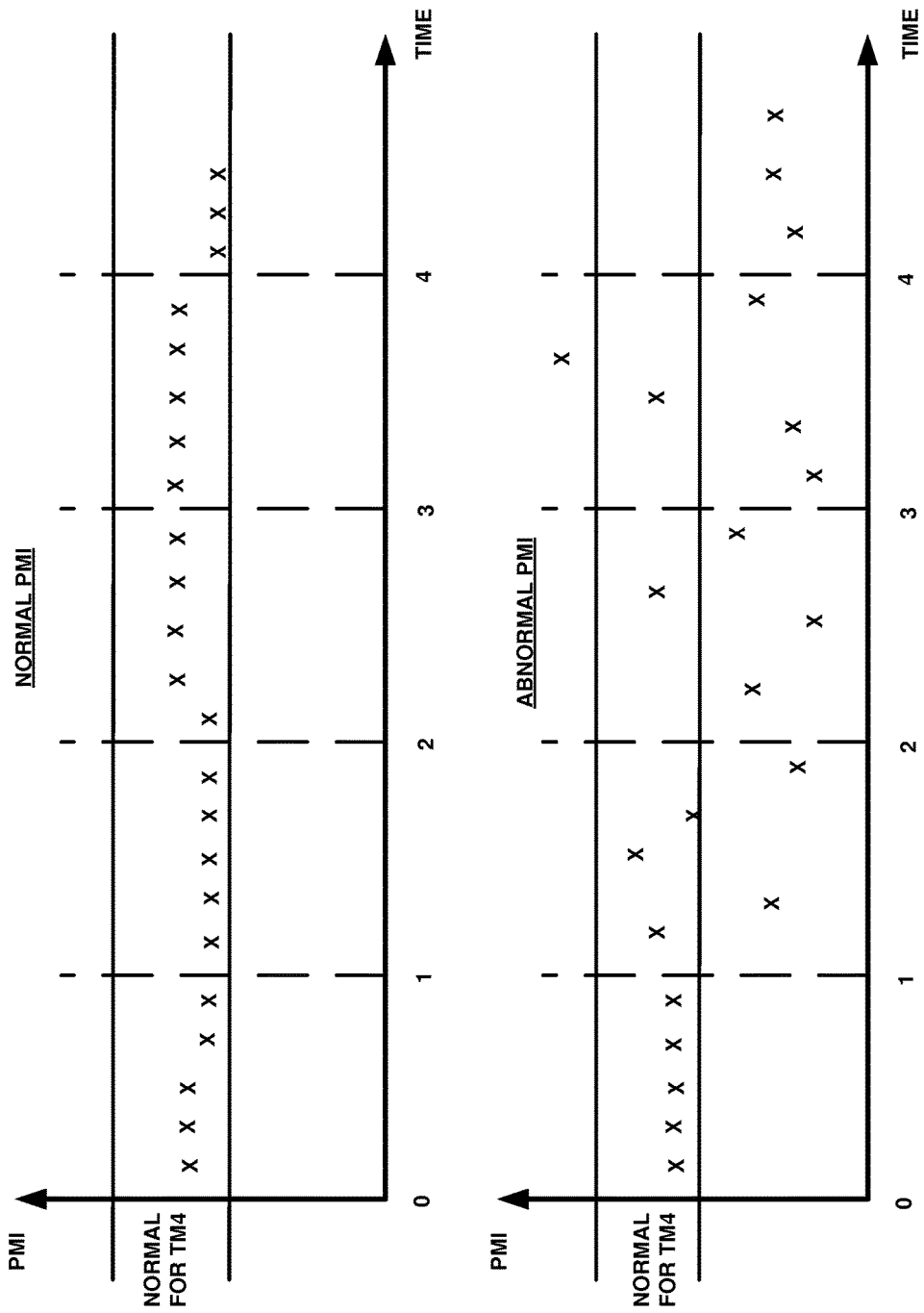

FIG. 7 illustrates graphs of PMIs to determine if a feedback loop for a UE is experiencing a lag condition, and if so, switching to another transmit protocol. Here, lag condition is determined for TM 4 and based on PMIs provided in the TM4 feedback data. Again, both a normal PMI graph and an abnormal PMI graph are illustrated. The graphs include maximum and minimum PMI thresholds for TM4. These thresholds can be determined specifically for TM4 or another other transmission mode using field testing. Different transmission modes could have thresholds that range in size.

Referring to normal PMI graph, between time 0 and time 2, the PMIs are within the PMI threshold ranges. Between time 2 and time 4, the PMIs begin to steadily move to another PMI value but remain within the PMI threshold indicating that the UE may have moved around within or away from the cell but has become stationary again. Therefore, TM4 is providing feedback data consistently enough for the OFDM access point to use the feedback data from the feedback loop to adjust TM4 transmit parameters for the UE. In contrast, the abnormal PMI graph below the normal PMI graph shows PMIs ranging inconsistently above and below the PMI thresholds and do not follow any PMI patterns determined for TM4. This may be the result of the UE moving around within the cell and therefore, that a lag condition exists and that the OFDM access point must switch transmit protocols, such as to TM3.

Figure 8:
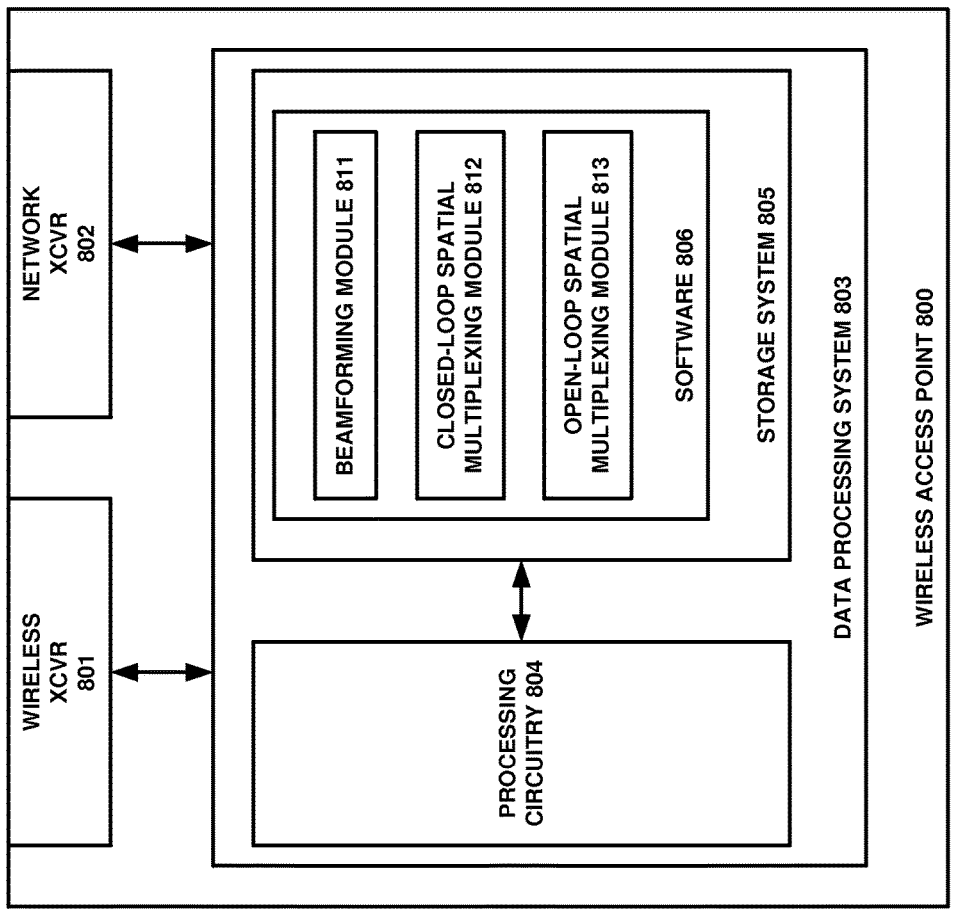
FIG. 8 illustrates an OFDM access point to determine if a feedback loop for a UE is experiencing a lag condition, and if so, switching to another transmit protocol.

FIG. 8 illustrates OFDM access point 800 to determine if an OFDM feedback loop is experiencing a lag condition, and if so, switching to another transmit protocol. Wireless access point 800 comprises wireless transceiver 801, network transceiver 802, and data processing system 803. Wireless access point 800 is an example of wireless access point 101 and eNodeB 401, although these systems may use alternative configurations and operations. Some conventional aspects of wireless access point 800 are omitted for clarity, such as power supplies, enclosures, and the like. Wireless access point 800 may be centralized in a single unit or distributed across multiple components.

Wireless transceiver 801 comprises antennas, amplifiers, filters, circuitry, digital signal processors, memory devices, wireless protocol software, bus interfaces, and the like. Network transceiver 802 comprises layer two ports, circuitry, processing circuitry, memory devices, networking software, bus interfaces, and the like. Wireless transceiver 801 exchanges wireless signals using/avoiding shielded sub-bands as described herein. Network transceiver 802 exchanges network signaling indicating the sub-bands to use or avoid as described herein.

Data processing system 803 comprises processing circuitry 804 and storage system 805. Storage system 805 stores software 806. Software 806 includes software modules 811-813. Processing circuitry 804 comprises server blades, backplanes, bus interfaces, integrated circuitry, and associated electronics. Storage system 805 comprises non-transitory, machine-readable, data storage media, such as flash drives, disc drives, memory circuitry, tape drives, servers, and the like. Software 806 comprises machine-readable instructions that control the operation of processing circuitry 804 when executed. Software 806 includes software modules 811-813 and may also include operating systems, applications, data structures, virtual machines, utilities, databases, and the like. All or portions of software 806 may be externally stored on one or more storage media, such as circuitry, discs, tape, and the like.

When executed by processing circuitry 804, beamforming module 811 directs processing circuitry 804 to receive and process beamforming feedback data from a UE to form a beamforming feedback loop and responsively transmit a beamformed radio signal to the UE. When executed by processing circuitry 804, beamforming module 811 also directs processing circuitry 804 to determine if the beamforming feedback loop is experiencing a beamforming lag condition, an if so, switching to a closed-loop spatial multiplexing transmit protocol.

When executed by processing circuitry 804, closed-loop spatial multiplexing module 812 directs circuitry 804 to receive and process closed-loop spatial multiplexing feedback data from the UE to form a closed-loop spatial multiplexing feedback loop and responsively transmit a closed-loop spatial multiplexed radio signal to the UE. When executed by processing circuitry 804, closed-loop spatial multiplexing module 812 also directs circuitry 804 to determine if the closed-loop spatial multiplexing feedback loop is experiencing a closed-loop spatial multiplexing lag condition, an if so, switching to an open-loop spatial multiplexing transmit protocol.

When executed by processing circuitry 804, open-loop spatial multiplexing module 813 directs circuitry 804 to receive and process open-loop spatial multiplexing feedback data from the UE to form an open-loop spatial multiplexing feedback loop and responsively transmit an open-loop spatial multiplexed radio signal to the UE.

Figure 9:
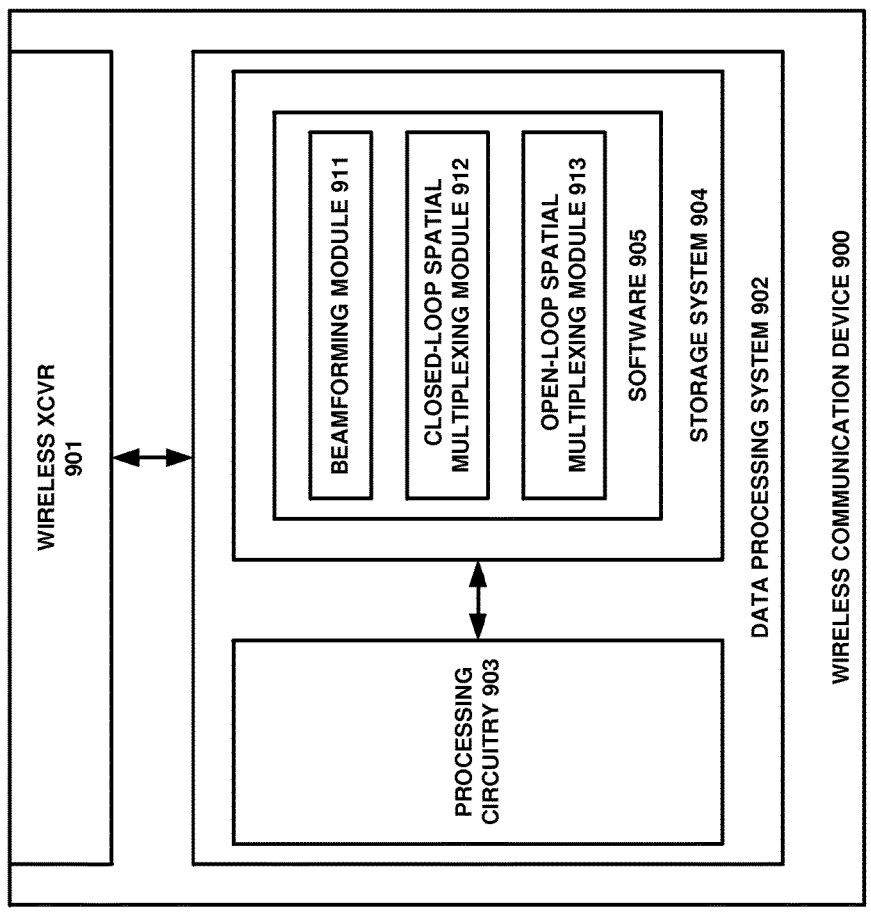
FIG. 9 illustrates a UE that uses a determination that a feedback loop for the UE is experiencing a lag condition and receives an instruction to switch to another transmit protocol.

FIG. 9 illustrates a UE that uses shielded OFDM sub-bands to communicate with wireless access points. UE 900 comprises wireless transceiver 901 and data processing system 903. UE 900 is an example of UE 102 and 402, although these devices may use alternative configurations and operations. Some conventional aspects of UE 900 are omitted for clarity, such as user interfaces, power supplies, enclosures, and the like. UE 900 may be centralized in a single unit or distributed across multiple components.

Wireless transceiver 901 comprises antennas, amplifiers, filters, circuitry, digital signal processors, memory devices, wireless protocol software, bus interfaces, and the like. Wireless transceiver 901 measures and communicates over shielded sub-bands as described herein. In particular, wireless transceiver 901 manipulates its filtering to perform both wideband and sub-band measurements.

Data processing system 902 comprises processing circuitry 903 and storage system 904. Storage system 904 stores software 905. Software 905 includes software modules 911-913. Processing circuitry 903 comprises circuit boards, bus interfaces and connections, integrated circuitry, and associated electronics. Storage system 904 comprises non-transitory, machine-readable, data storage media, such as flash drives, disc drives, memory circuitry, tape drives, servers, and the like. Software 905 comprises machine-readable instructions that control the operation of processing circuitry 903 when executed. Software 905 includes software modules 911-913 and may also include operating systems, applications, data structures, virtual machines, utilities, databases, and the like. All or portions of software 905 may be externally stored on one or more storage media, such as circuitry, discs, tape, and the like.

When executed by processing circuitry 905, network interface module 911 directs circuitry 903 to exchange beamforming feedback data and beamformed radio signals with the OFDM access point to form beamforming feedback loops. When executed by processing circuitry 903, closed-loop spatial multiplexing module 912 directs circuitry 903 to exchange closed-loop spatial multiplexing feedback data and closed-loop spatial multiplexed radio signals with the OFDM access point to form closed-loop spatial multiplexing feedback loops. When executed by processing circuitry 903, open-loop spatial multiplexing module 913 directs circuitry 903 to exchange open-loop spatial multiplexing feedback data and open-loop spatial multiplexed radio signals with the OFDM access point to form open-loop spatial multiplexing feedback loops.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating an Orthogonal Frequency Division Multiplexing (OFDM) access point comprising:
   receiving and processing beamforming feedback data from User Equipment (UE) to form a beamforming feedback loop and responsively transmitting a beamformed radio signal to the UE;
   determining that the beamforming feedback data is randomly changing in response to adjustments, and responsively switching to a closed-loop spatial multiplexing transmit protocol;
   receiving and processing closed-loop spatial multiplexing feedback data from the UE to form a closed-loop spatial multiplexing feedback loop and responsively transmitting a closed-loop spatial multiplexed radio signal to the UE;

determining that the closed-loop spatial multiplexing feedback data is randomly changing in response to adjustments, and responsively switching to an open-loop spatial multiplexing transmit protocol; and receiving and processing open-loop spatial multiplexing feedback data from the UE to form an open-loop spatial multiplexing feedback loop and responsively transmitting an open-loop spatial multiplexed radio signal to the UE.

2. The method of claim 1 wherein the beamforming feedback data and the beamforming feedback loop comprise Long Term Evolution (LTE) Transmission Mode 8 (TM8).

3. The method of claim 1 wherein the beamforming feedback data and the beamforming feedback loop comprise Long Term Evolution (LTE) Transmission Mode 9 (TM9).

4. The method of claim 1 wherein the closed-loop spatial multiplexing feedback data and the closed-loop spatial multiplexing feedback loop comprise Long Term Evolution (LTE) Transmission Mode 4 (TM4).

5. The method of claim 1 wherein the open-loop spatial multiplexing feedback data and the open-loop spatial multiplexing feedback loop comprise Long Term Evolution (LTE) Transmission Mode 3 (TM3).

6. The method of claim 1 wherein the beamforming feedback data and the beamforming feedback loop comprise dual-layer beamforming feedback data and a dual-layer beamforming feedback loop and further comprising:

receiving and processing multi-layer beamforming feedback data from the UE to form a multi-layer beamforming feedback loop and responsively transmitting a multi-layer beamformed radio signal to the UE;

determining that the multi-layer beamforming feedback data is randomly changing in response to adjustments, and responsively switching to a dual-layer beamforming transmit protocol; and transmitting a dual-layer beamformed radio signal to the UE.

7. The method of claim 6 wherein the dual-layer beamforming feedback data and the dual-layer beamforming feedback loop comprise Long Term Evolution (LTE) Transmission Mode 8 (TM8).

8. The method of claim 6 wherein the multi-layer beamforming feedback data and the multi-layer beamforming feedback loop comprise Long Term Evolution (LTE) Transmission Mode 9 (TM9).

9. The method of claim 6 wherein:

the multi-layer beamforming feedback data comprises first multi-layer beamforming feedback data for a first set of data layers and second multi-layer beamforming feedback data for a second set of data layers;

the multi-layer beamforming feedback loop comprises first multi-layer beamforming feedback loop for the first set of the data layers and a second multi-layer beamforming feedback loop for the second set of the data layers;

determining that the first and the second multi-layer beamforming feedback data is randomly changing in response to adjustments, and responsively switching to the dual-layer beamforming transmit protocol; and transmitting a dual-layer beamformed radio signal to the UE.

10. The method of claim 1 wherein the OFDM access point comprises a Long Term Evolution (LTE) network.

11. An Orthogonal Frequency Division Multiplexing (OFDM) access point comprising:

a data processing system configured to process beamforming feedback data received by a wireless communication transceiver from User Equipment (UE) to form a beamforming feedback loop, and the wireless communication transceiver configured to responsively transmit a beamformed radio signal to the UE;

the data processing system configured to determine that the beamforming feedback data is randomly changing in response to adjustments, and responsively switch to a closed-loop spatial multiplexing transmit protocol;

the data processing system configured to process closed-loop spatial multiplexing feedback data received by the wireless communication transceiver from the UE to form a closed-loop spatial multiplexing feedback loop, and the wireless communication transceiver configured to responsively transmit a closed-loop spatial multiplexed radio signal to the UE;

the data processing system configured to determine that the closed-loop spatial multiplexing feedback data is randomly changing in response to adjustments, and responsively switch to an open-loop spatial multiplexing transmit protocol; and the data processing system configured to process open-loop spatial multiplexing feedback data received by the wireless communication transceiver from the UE to form an open-loop spatial multiplexing feedback loop, and the wireless communication transceiver configured to responsively transmit an open-loop spatial multiplexed radio signal to the UE.

12. The OFDM access point of claim 11 wherein the beamforming feedback data and the beamforming feedback loop comprise Long Term Evolution (LTE) Transmission Mode 8 (TM8).

13. The OFDM access point of claim 11 wherein the beamforming feedback data and the beamforming feedback loop comprise Long Term Evolution (LTE) Transmission Mode 9 (TM9).

14. The OFDM access point of claim 11 wherein the closed-loop spatial multiplexing feedback data and the closed-loop spatial multiplexing feedback loop comprise Long Term Evolution (LTE) Transmission Mode 4 (TM4).

15. The OFDM access point of claim 11 wherein the open-loop spatial multiplexing feedback data and the open-loop spatial multiplexing feedback loop comprise Long Term Evolution (LTE) Transmission Mode 3 (TM3).

16. The OFDM access point of claim 11 wherein the beamforming feedback data and the beamforming feedback loop comprise dual-layer beamforming feedback data and a dual-layer beamforming feedback loop and further comprising:

the data processing system configured to process multi-layer beamforming feedback data received by the wireless communication transceiver from the UE to form a multi-layer beamforming feedback loop, and the wireless communication transceiver configured to responsively transmit a multi-layer beamformed radio signal to the UE;

the data processing system configured to determine that the multi-layer beamforming feedback data is randomly changing in response to adjustments, and responsively switch to a dual-layer beamforming transmit protocol; and the wireless communication transceiver configured to transmit a dual-layer beamformed radio signal to the UE.

17. The OFDM access point of claim 16 wherein the dual-layer beamforming feedback data and the dual-layer beamforming feedback loop comprise Long Term Evolution (LTE) Transmission Mode 8 (TM8).

18. The OFDM access point of claim 16 wherein the multi-layer beamforming feedback data and the multi-layer beamforming feedback loop comprise Long Term Evolution (LTE) Transmission Mode 9 (TM9).

19. The OFDM access point of claim 16 wherein:
the multi-layer beamforming feedback data comprises first multi-layer beamforming feedback data for a first set of data layers and second multi-layer beamforming feedback data for a second set of data layers;
the multi-layer beamforming feedback loop comprises first multi-layer beamforming feedback loop for the first set of the data layers and a second multi-layer beamforming feedback loop for the second set of the data layers;
the data processing system configured to determine that the multi-layer beamforming feedback data is randomly changing in response to adjustments, and responsively switch to the dual-layer beamforming transmit protocol; and
the wireless communication transceiver configured to transmit a dual-layer beamformed radio signal to the UE.

20. The OFDM access point of claim 11 wherein the OFDM access point comprises a Long Term Evolution (LTE) network.

\* \* \* \* \*